G. CHILSON.
Damper.
No. 1,739.
Reissued Aug. 16, 1864.
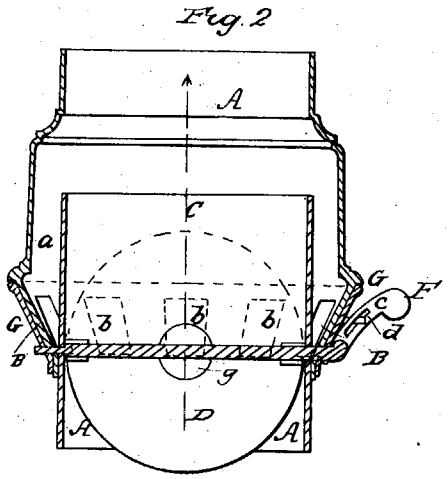
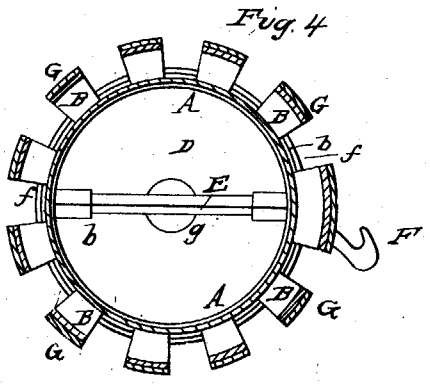
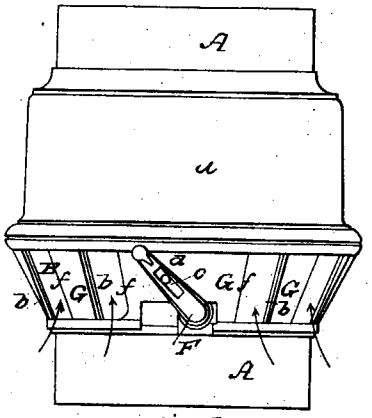
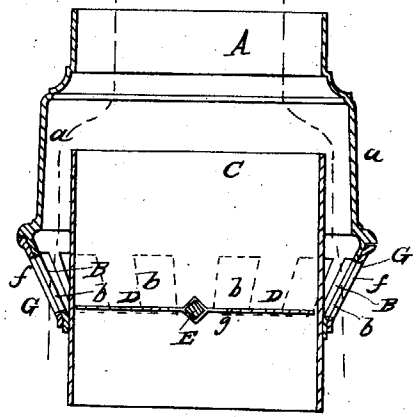
WITNESSES
A. P. Hale Jr.
Frederick Curtis
INVENTOR
Gardner Chilson
by his atty
R. H. Eddy.
N. PETERS, Photo-Lithographer, Washington, D. C.

UNITED STATES PATENT OFFICE.

GARDNER CHILSON, OF BOSTON, MASSACHUSETTS.

IMPROVED DRAFT-REGULATOR AND VENTILATOR.

Specification forming part of Letters Patent No. 35,080, dated April 29, 1864; Reissue No. 1,739, dated August 16, 1864.

*To all whom it may concern:*

Be it known that I, GARDNER CHILSON, a citizen of the United States, and now or late a resident of Boston, in the county of Suffolk and State of Massachusetts, have invented a new and useful or improved apparatus to be applied to a smoke pipe or flue for the purpose of regulating the draft thereof, as well as for ventilating an apartment and economizing the consumption of fuel in a stove, furnace, or fire-place; and I do hereby declare my said invention to be fully described in the following specification and illustrated in the accompanying drawings, of which—

Figure 1 is a side view, Figs. 2 and 3 longitudinal sections, and Fig. 4 a transverse section, of it.

The nature of my invention consists in the arrangement and combination of an annular air-register and a damper, the whole being or to be applied to a smoke-pipe, substantially in manner as hereinafter described; also, in the combination and arrangement of an annular current-guard with an annular air-register, combined or to be arranged with respect to a smoke pipe or conduit, and so as to operate therewith, substantially as hereinafter specified; also, in the combination and arrangement of an annular current-guard, an air-register, and a damper, the whole being or to be applied together and to a smoke-pipe, in manner substantially as hereinafter specified; also, in the combination of an enlargement or annular space with the annular register and the current-guard, the same being or to be applied to and arranged with a smoke-pipe, substantially in manner as hereinafter described; also, in the combination of an enlargement or annular space with the annular air-register, the current-guard, and a damper, the whole being arranged or to be arranged with a conduit or smoke-pipe, and so as to operate therewith substantially in the manner as hereinafter explained; also, in the combination of the damper and the annular air-register valve, by means substantially as hereinafter described, whereby both damper and valve may be moved simultaneously; also, in the annular air-register constructed and combined or arranged with respect to a pipe or conduit, substantially in manner as hereinafter described.

In the drawings, A represents a short pipe made with an enlargement or swell, *a*, whose base or lower part, B, is a conic frustum, and is provided with a series of air-holes, *b b b*, extended through it and arranged at equal distances apart. The lower part of the pipe is provided with a cylindrical extension or guard, C, which projects above the said holes and upward within the enlargement of the pipe, as shown in Figs. 2 and 3. The extension or enlargement *a* forms an annular air space or passage around the guard C, and over it opens into that part of the pipe A which is over the enlargement *a*. As the guard C has a diameter at least equal to that of the pipe A, any soot which may fall down the pipe A will be pitched directly into the guard C, or into that part of the pipe A which is below the air-register rather than into the air passage between the guard C and the inner surface of the enlargement *a*; consequently the enlargement *a*, arranged with respect to the pipe A and the air-register as herein described, operates to protect the said register from falling soot, the guard C also serving as a further protection to it.

A circular damper, D, is arranged in the lower part of the pipe A, and has its shaft E extended through the pipe and provided with a curved handle, as shown at F. A slot, *c*, is formed longitudinally through this handle, and receives a stud or pin, *d*, which projects from an annular register-valve, G. The said valve encompasses the seat B, and, like it, is provided with a series of holes, *f f f*, which are disposed at such distances apart as to cause the spaces between them to operate as a means of closing the openings *b b b*, more or less, while the valve G may be in the act of being turned around on its seat.

The damper D is made with a small hole, *g*, through it and near its center, and such damper should be so arranged on its shaft as to have its plane square to the axis of the pipe when the valve-holes of the air-register are fully open. When the damper and the register-valve are connected, as described, any movement of the damper handle so as to turn the damper laterally will produce a movement of the annular air-register valve G, and the more the damper may be turned so as to increase the smoke-passage around it the more will the air-register valve G be moved so as to diminish the ingress of air into the smoke-pipe and in advance of the damper. Thus it will be seen that when the air-register is entirely closed the damper will be wholly open or will stand with its plane in the direction of the axis of the pipe.

My invention when applied to the smoke-pipe of a stove or furnace or a fire-place will enable the draft thereof to be regulated to excellent advantage. It will also secure steadiness of combustion and economy in the consumption of fuel, thus producing uniform or proper temperature in the room; and besides all these it serves the purpose of ventilating the apartment in which the stove, furnace, or fire-place may be.

When the damper is closed, the small orifice *g* will suffice to maintain a sufficient current from or through the fuel to keep the latter in cumbustion. The damper, however, may be made without the hole *g* if preferable.

While the fuel of the stove or furnace is being kindled, the damper should be entirely open, in which case the air-register will be closed. After the kindling of the fuel may have been effected, the damper may be closed more or less, in which case the air-register or ventilator will be opened, and by suffering jets of cold air to pass into the smoke flue or pipe will moderate the draft through the fire.

With my invention applied to the discharge-pipe of a stove or furnace the main doors of the latter during combustion of the fuel may generally be kept closed, whereby the fuel may be burned with great economy and regularity, the smoke and gaseous products of combustion being by such means retained in contact with the flame and fuel until they may be consumed and caused to impart heat to the distributing-surfaces about them.

The annular current guard C, besides serving to protect the air-register from falling soot, is also an air-deflector, or, in other words, it will operate to direct the influent currents of air upward and prevent them from impinging directly on the damper and coursing down that part of the pipe which may be below such damper. If preferable, the air-register valve and the damper may be disconnected, so as to operate independently of each other. The annular air-register when made in manner and combined and arranged with a smoke-pipe or conduit as described causes the air admitted by it into the pipe to be evenly distributed around a current of smoke when passing through the pipe. This even distribution of the air promotes regularity of combustion, as it produces steadiness of draft through the pipe and operates to prevent any back flowage of smoke, such as often happens where an air-register is applied only partially around a pipe or against one side of it only.

The further arrangement of the air-register—viz., in the form of an inverted conic frustum encompassing the smoke-pipe—renders it advantageous in other respects, as such arrangement not only facilitates in various ways the admission of the air through the openings of the register, but it operates to prevent the register from being clogged with soot or ashes which by accident may fall down the conduit and upon such register.

I claim—

1. The arrangement and combination of an annular air-register, B G, and a damper, D, the whole being or to be applied to a smoke-pipe, A, substantially as described.

2. The combination and arrangement of an annular current-guard, C, with an annular air-register, B G, combined or to be arranged with respect to a pipe or conduit, A, and so as to operate therewith, substantially as specified.

3. The combination and arrangement of an annular current-guard, C, an air-register, B G, and a damper, D, the whole being or to be applied together and to a smoke-pipe, A, in manner substantially as specified.

4. The combination of the enlargement *a*, or the additional space made thereby, with the annular air-register B G and the current-guard C.

5. The connection of the damper and the annular register-valve by means of the slotted arm E and their pin *d*, whereby both damper and valve may be moved simultaneously, as described.

6. The combination of the enlargement *a*, or the additional space formed thereby, with the annular air-register B G, the current-guard C, and the damper D.

GARDNER CHILSON.

Witnesses:
R. H. EDDY,
F. P. HALE, Jr.